US012743219B2

(12) United States Patent
Wu et al.

(10) Patent No.: US 12,743,219 B2
(45) Date of Patent: Sep. 22, 2026

(54) POWER STATE CONTROL METHOD AND DATA STORAGE SYSTEM

(71) Applicant: Acer Incorporated, New Taipei City (TW)

(72) Inventors: Hung-Sheng Wu, New Taipei City (TW); Wei-Kuo Shih, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 0 days.

(21) Appl. No.: 18/595,438

(22) Filed: Mar. 5, 2024

(65) Prior Publication Data

US 2025/0103228 A1 Mar. 27, 2025

(30) Foreign Application Priority Data

Sep. 26, 2023 (TW) ................................ 112136903

(51) Int. Cl.
*G06F 3/06* (2006.01)

(52) U.S. Cl.
CPC .......... *G06F 3/0634* (2013.01); *G06F 3/0613* (2013.01); *G06F 3/0673* (2013.01)

(58) Field of Classification Search
CPC ..... G06F 3/0673; G06F 3/0613; G06F 3/0634
See application file for complete search history.

(56) References Cited

U.S. PATENT DOCUMENTS

| | | | | |
|---|---|---|---|---|
| 10,564,868 | B2 * | 2/2020 | Afriat | G06F 3/0634 |
| 2014/0359198 | A1 * | 12/2014 | Zaltsman | G06F 3/0605 711/103 |
| 2017/0068451 | A1 * | 3/2017 | Kenan | G06F 3/0659 |
| 2017/0269860 | A1 * | 9/2017 | Geml | G06F 3/0634 |
| 2017/0315747 | A1 * | 11/2017 | Yang | G06F 3/0634 |
| 2019/0114276 | A1 * | 4/2019 | Hodes | G06F 13/4027 |
| 2021/0405731 | A1 * | 12/2021 | Navon | G06F 1/3275 |
| 2022/0137848 | A1 * | 5/2022 | Lim | G06F 3/0647 711/154 |
| 2022/0269610 | A1 * | 8/2022 | Lee | G06F 3/061 |
| 2024/0311010 | A1 * | 9/2024 | Fujimoto | G06F 3/0634 |
| 2025/0028457 | A1 * | 1/2025 | Vlaiko | G06F 3/0659 |

FOREIGN PATENT DOCUMENTS

| | | |
|---|---|---|
| CN | 101770276 | 7/2010 |
| CN | 102013272 | 4/2011 |
| TW | 201025023 | 7/2010 |
| TW | 201346517 | 11/2013 |
| TW | M520669 | 4/2016 |
| TW | M528477 | 9/2016 |
| TW | I768373 | 6/2022 |
| TW | I768829 | 6/2022 |

* cited by examiner

*Primary Examiner* — Edward J Dudek, Jr.
(74) *Attorney, Agent, or Firm* — JCIPRNET

(57) ABSTRACT

A power state control method and a data storage system are disclosed. The method includes: establishing a connection between a host system and a storage device; detecting a data access performance of the storage device through the connection; and instructing the storage device to operate at one of a plurality of power states of a normal work state according to the data access performance.

10 Claims, 2 Drawing Sheets

41

| power states | setting information |
|---|---|
| A | PS0, power upper limit =100% |
| B | PS0, power upper limit =90% |
| C | PS0, power upper limit =80% |
| ⋮ | ⋮ |

POWER STATE CONTROL METHOD AND DATA STORAGE SYSTEM

CROSS-REFERENCE TO RELATED APPLICATION

This application claims the priority benefit of Taiwan application serial no. 112136903, filed on Sep. 26, 2023. The entirety of the above-mentioned patent application is hereby incorporated by reference herein and made a part of this specification.

BACKGROUND

Technical Field

The invention relates to a power state control method and a data storage system.

Description of Related Art

Generally speaking, in order to prevent a temperature or a power load of a storage device from being too high, the storage device may be configured with multiple operating modes, for example, operating modes PS0-PS4. Among them, the operating modes PS0-PS2 belong to a normal working state, while the operating modes PS3 and PS4 belong to a non-working state. In particular, in the operating modes PS0 to PS4, the power consumption of the storage device per unit time (and the temperature of the storage device) are gradually reduced. However, as the frequency of storage devices and the maximum transmission speed supported by the storage device become higher and higher, these default operating modes are no longer sufficient. For example, when the storage device uses the Peripheral Component Interconnect Express (PCI Express) fifth generation (Gen 5) standard to communicate with a host system, in the normal working state of the storage device (such as PS0), regardless of the current performance of the storage device, the temperature of the storage device can easily rise above a temperature threshold and then a cooling process for the storage device can be activated frequently, thus reducing the operational stability of the storage device.

SUMMARY

The invention provides a power state control method and a data storage system, which can improve the operational stability of the storage device.

An embodiment of the present invention provide a power state control method, which includes: establishing a connection between a host system and a storage device; detecting a data access performance of the storage device through the connection; and instructing the storage device to operate at one of a plurality of power states of a normal working state based on the data access performance.

An embodiment of the present invention further provides a data storage system, which includes a host system and a storage device. The storage device is coupled to the host system. The host system is configured to: establish a connection between the host system and the storage device; detect a data access performance of the storage device through the connection; and instruct the storage device to operate at one of a plurality of power states of a normal working state based on the data access performance.

Based on the above, after the connection between the host system and the storage device is established, the host system can dynamically instruct the storage device to operate at one of the plurality power states of (or under) the normal working state by dynamically detecting the data access performance of the storage device. In this way, the operational stability of the storage device can be effectively improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
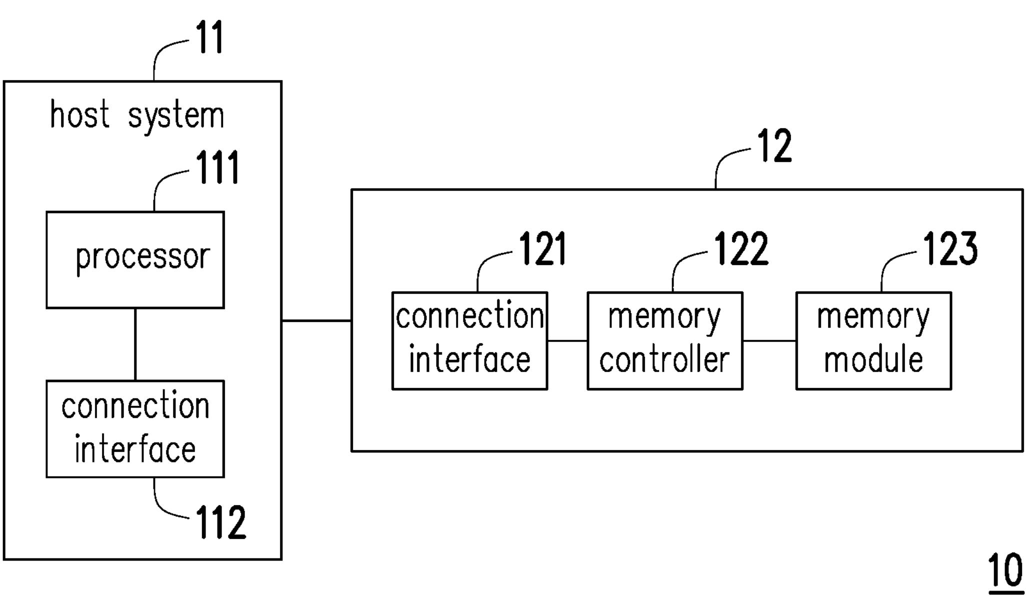
FIG. 1 is a schematic diagram of a data storage system according to an embodiment of the present invention.

FIG. 1 is a schematic diagram of a data storage system according to an embodiment of the present invention. Referring to FIG. 1, a data storage system 10 includes a host system 11 and a storage device (such as a memory device) 12. The host system 11 can store data into the storage device 12 or read data from the storage device 12. For example, the host system 11 can be any system that can actually cooperate with the storage device 12 to store data, such as a computer system, a digital camera, a video camera, a communication device, an audio player, a video player or a tablet computer, etc., and the storage device 12 can be various non-volatile storage devices such as a pen drive, a memory card, a solid state drive (SSD), a secure digital (SD) card, a compact flash (CF) card or an embedded storage device.

The host system 11 includes a processor 111 and a connection interface 112. The processor 111 may include a central processing unit (CPU) or other programmable general-purpose or special-purpose microprocessor, Digital Signal Processor (DSP), programmable controller, Application Specific Integrated Circuits (ASIC), Programmable Logic Device (PLD) or other similar devices or a combination of these devices. The processor 111 is configured to control the entire or partial operations of the host system 11. It should be noted that, in the following embodiments, the description of the operation of the host system 11 may be equivalent to the description of the operation of the processor 111.

The connection interface 112 is coupled to the processor 111 and configured to transmit data (or signals) to the storage device 12 or receive data (or signals) from the storage device 12. In one embodiment, the host system 11 may also include any practically required hardware devices, such as a battery unit, a network interface card, a keyboard (or a touchpad), a screen and/or a speaker, etc.

The storage device 12 includes a connection interface 121, a memory controller 122 and a memory module 123. The connection interface 121 is configured to connect to the connection interface 112 of the host system 11 and communicate with the host system 11 via the connection interface 112. In one embodiment, the connection interfaces 112 and 121 comply with Non-Volatile Memory Express (NVMe) interface standard. In one embodiment, the connection interfaces 112 and 121 may also comply with Serial Advanced Technology Attachment (SATA), Parallel Advanced Technology Attachment (PATA), Peripheral Component Interconnect Express (PCI Express), Universal Serial Bus (USB) and/or other connection interface standards.

The memory controller 122 is coupled to the connection interface 121 and the memory module 123. The memory controller 122 is configured to execute a plurality of logic gates or control instructions implemented in a hardware type or a firmware type and write, read and erase data in the memory module 123 according to the instructions of the host system 11. In addition, the memory controller 122 can also control the overall operation of the storage device 12. In one embodiment, the memory controller 122 may include a flash memory controller or other types of controllers. It should be noted that, in the following embodiments, the description of the operation of the storage device 12 may be equivalent to the description of the operation of the memory controller 122.

The memory module 123 is configured to store data written by the host system 11. For example, the memory module 123 may include a flash memory module. For example, the memory module 123 may include a Single Level Cell (SLC) NAND flash memory module (that is, a flash memory module in which one memory cell can store 1 bit), a Multi-Level Cell (MLC) NAND flash memory module (that is, a flash memory module that can store 2 bits in one memory cell), a Triple Level Cell (TLC) NAND flash memory module (that is, a flash memory module that can store 3 bits in one memory cell) and/or a Quad Level Cell (QLC) NAND flash memory module (that is, a flash memory module that can store 4 bits in one memory cell). In addition, the memory cells in the memory module 123 store data based on changes in threshold voltages. In one embodiment, the memory module 123 may include other types of data storage circuits, which are not limited by the present invention.

Figure 2:
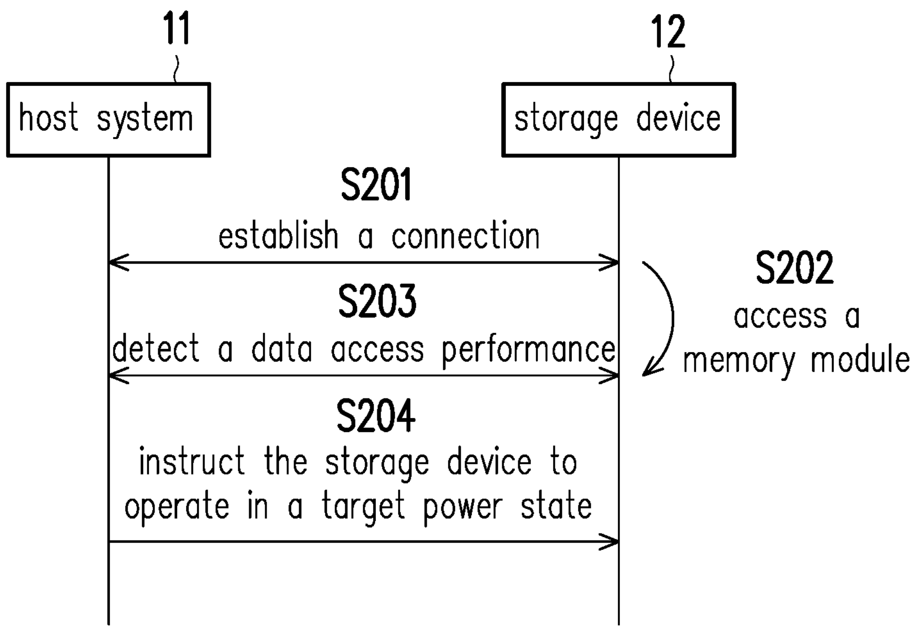
FIG. 2 is a flow chart of a power state control method according to an embodiment of the present invention.

FIG. 2 is a flow chart of a power state control method according to an embodiment of the present invention. Referring to FIG. 1 and FIG. 2, in step S201, a connection between the host system 11 and the storage device 12 is established. For example, in step S201, a handshake operation may be performed between the host system 11 and the storage device 12 to perform operation behaviors related to the establishing of the connection, such as a clock calibration, between the host system 11 and the storage device 12. After the handshake operation is completed, the connection between the host system 11 and the storage device 12 can be established. Afterwards, the host system 11 and the storage device 12 can communicate based on the connection. For example, the connection may comply with the NVMe interface standard.

In step S202, the storage device 12 can access the memory module 123 under a normal working state. Taking the five common power states PS0-PS4 of the storage device 12 as an example, the normal working state may be one of the power states PS0-PS2, while the power states PS3 and PS4 are non-working states. For example, in the power states PS0 to PS4, the power consumption per unit time (and the temperature) of the storage device gradually decreases.

In one embodiment, after the connection between the host system 11 and the storage device 12 is established, in step S202, the host system 11 can send various commands, such as a read command, a write command, or a delete command, to the storage device 12 through the connection. The storage device 12 can access the memory module 123 or perform corresponding operations according to instructions (i.e., the commands) from the host system 11. For example, according to a read command from the host system 11, the storage device 12 may read specific data from the memory module 123 in response to the read command. Alternatively, according to a write command from the host system 11, the storage device 12 can store specific data into the memory module 123 in response to the write command. Alternatively, according to a delete command from the host system 11, the storage device 12 may delete specific data from the memory module 123 in response to the delete command. In addition, in one embodiment, in step S202, the storage device 12 may also automatically perform other operations including accessing of the memory module 123 such as Garbage Collection (GC) or wear leveling in the background, which is not limited by the invention.

In step S203, the host system 11 can detect a data access performance of the storage device 12 through the connection. For example, the data access performance may reflect at least one of a data reading speed and data writing speed of the memory module 123 in the storage device 12 under the normal working state. For example, the data reading speed can reflect a read data among per unit time of the memory module 123 (e.g., how much data can be read from the memory module 123 per second) during the period when the memory module 123 is operated at the normal working state. For example, the data writing speed can reflect a write data among per unit time of the memory module 123 (e.g., how much data can be write into the memory module 123 per second) during the period when the memory module 123 is operated at the normal working state.

After obtaining the data access performance of the storage device 12, in step S204, the host system 11 may instruct the storage device 12 to operate at one of a plurality of power states (also known as target power state) of (or under) the normal working state. For example, taking the power state PS0 as an example of the normal working state, the plurality of power states may correspond to different power upper limits in the normal working state.

In one embodiment, in step S204, the storage device 12 can automatically operate at the target power state according to the instruction of the host system 11. For example, in the target power state, the total power consumption of the storage device 12 (e.g., the total power consumption per unit time) may be limited to being no greater than a power upper limit corresponding to the target power state.

Figures 3, 4:
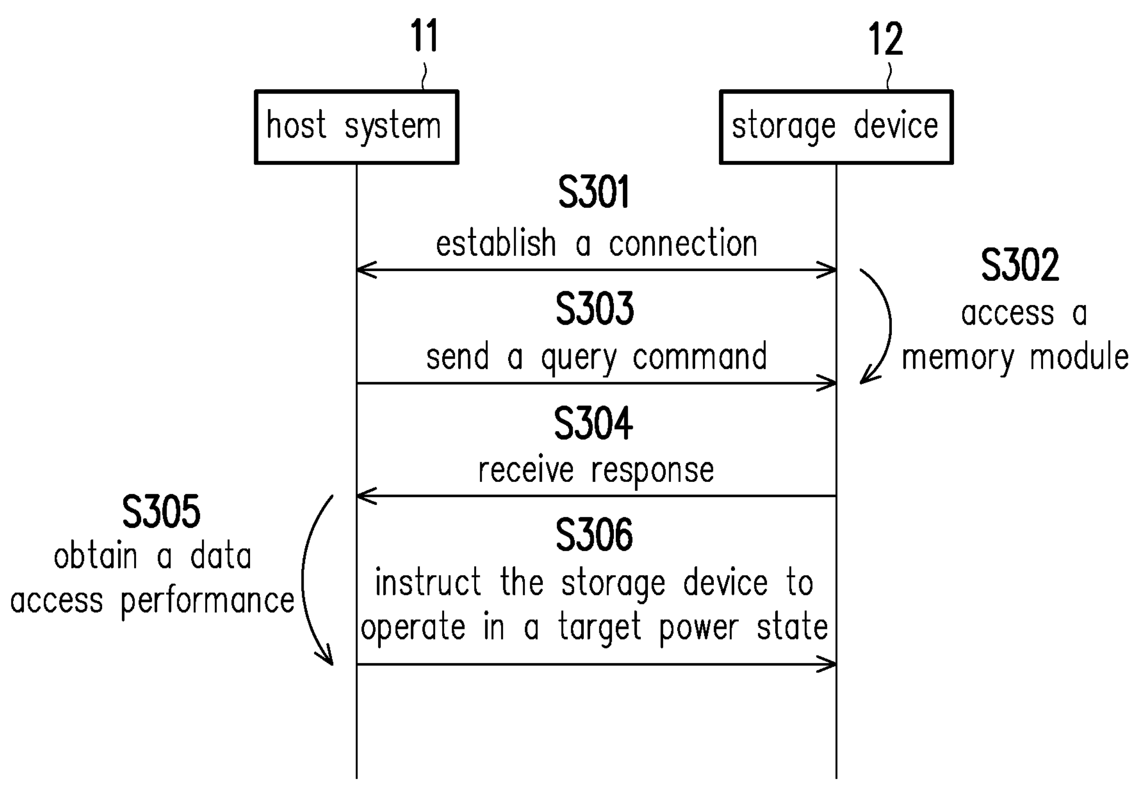
FIG. 3 is a flow chart of a power state control method according to an embodiment of the present invention.
FIG. 4 is a schematic diagram of setting information corresponding to a plurality of candidate power states according to an embodiment of the present invention.

FIG. 3 is a flow chart of a power state control method according to an embodiment of the present invention. Referring to FIG. 1 and FIG. 3, in step S301, a connection between the host system 11 and the storage device 12 is established. Step S301 is similar to step S201 in FIG. 2 and will not be repeated here. In step S302, the storage device 12 can access the memory module 123 at the normal working state. Step S302 is similar to step S202 in FIG. 2 and will not be repeated here.

In step S303, the host system 11 may send a query command to the storage device 12 through the connection. The query command is configured to query the data access performance of the storage device 12. For example, the query command can be designed as a developer (vender) command, a feature extraction (get feature) command in the NVMe interface standard, or other types of commands, which are not limited by the present invention. In response to the query command, the storage device 12 can obtain the data access performance of the storage device 12. For example, in response to the query command, the storage device 12 can detect and record the data access performance of the storage device 12 in real time.

In step S304, the storage device 12 may send a response with respect to the query command to the host system 11. For example, the response may include information that reflects the data access performance of the storage device 12. For example, the response may include information related to at least one of the data reading speed and the data writing speed of the memory module 123 in the storage device 12 operated at the normal working state. Then, the host system 11 may receive the response from storage device 12.

In step S305, the host system 11 can obtain the data access performance of the storage device 12 according to the response. For example, in step S305, the host system 11 can parse information reflecting the data access performance of the storage device 12 from the response, so as to obtain the data access performance of the storage device 12. Then, in step S306, the host system 11 can instruct the storage device 12 to operate at the target power state under the normal working state according to the data access performance. Step S306 is similar to step S204 in FIG. 2 and will not be repeated here.

In one embodiment, the plurality of power states may include a plurality of candidate power states of the normal working state. In step S204 of FIG. 2 and/or step S306 of FIG. 3, the host system 11 may select one of the plurality of candidate power states as the target power state according to the data access performance of the storage device 12. Then, the host system 11 can send a setting command to the storage device 12 according to the target power state. The setting command can be configured to set the storage device 12 to operate at the target power state. For example, the setting command may carry information related to the target power state. For example, the setting command can be designed as a developer (vender) command, a feature setting (set feature) command in the NVMe interface standard, or other types of commands, which are not limited by the present invention. In response to the setting command, the storage device 12 can automatically set the current power state of the storage device 12 to be the target power state.

FIG. 4 is a schematic diagram of setting information corresponding to a plurality candidate power states according to an embodiment of the present invention. Referring to FIG. 1 and FIG. 4, in one embodiment, setting information corresponding to a plurality of candidate power states (including power states A-C in the power state PS0) may be recorded in a data table 41. The host system 11 can query the data table 41 according to the obtained data access performance of the storage device 12 to obtain the target power state. For example, the host system 11 can obtain a candidate power state that matches the data access performance of the storage device 12 from the data table 41 according to the data access performance of the storage device 12 and set the candidate power state as the target power state.

In one embodiment, assuming that the query result of the data table 41 reflects that the data access performance of the storage device 12 matches the power state A, the host system 11 can set the power state A as the target power state and instruct the storage device 12 to operate at the target power state (i.e., the power state A). In particular, according to the setting information corresponding to the power state A, when operating in the power state A of the normal working state (such as the power state PS0), the total power consumption (such as the total power consumption per unit time) of the storage device 12 can be limited as no greater than 100% of the maximum power limit.

In one embodiment, assuming that the query result of the data table 41 reflects that the data access performance of the storage device 12 matches the power state B, the host system 11 can set the power state B as the target power state and instruct the storage device 12 to operate at the target power state (i.e., the power state B). In particular, according to the setting information corresponding to the power state B, when operating in the power state B of the normal working state (such as the power state PS0), the total power consumption (such as the total power consumption per unit time) of the storage device 12 can be limited as no greater than 90% of the maximum power limit.

In one embodiment, assuming that the query result of the data table 41 reflects that the data access performance of the storage device 12 matches the power state C, the host system 11 can set the power state B as the target power state and instruct the storage device 12 to operate at the target power state (i.e., the power state C). In particular, according to the setting information corresponding to the power state C, when operating in the power state C of the normal working state (such as the power state PS0), the total power consumption (such as the total power consumption per unit time) of the storage device 12 can be limited as no greater than 80% of the maximum power limit.

By analogy, according to different data access performance of the storage device 12, the host system 11 can instruct the storage device 12 to operate at different target power states (such as one of the power states A to C) under the normal working state. In addition, the data table 41 can also record other setting information corresponding to the candidate power states, which is not limited by the present invention. In addition, the data table 41 may also record other information that can be used to control the power state of the storage device 12, such as the clock frequency used by the storage device 12, etc., which is not limited by the present invention.

In one embodiment, the data access performance of the storage device 12 may be positively correlated to the set maximum power limit of the storage device 12. For example, when the data access performance of the storage device 12 is relatively poor (for example, the data reading speed and/or data writing speed of the memory module 123 is relatively low), by dynamically reducing the maximum power limit of the storage device 12, the power consumption of the storage device 12 and/or the number of times of activation of the cooling process of the storage device 12 can be effectively reduced. In addition, when the data access performance of the storage device 12 is relatively good (for example, the data reading speed and/or the data writing speed of the memory module 123 is relatively high), by dynamically increasing the maximum power limit of the storage device 12, the performance of the storage device 12 can be effectively increased (or restored).

In summary, after establishing a connection between the host system and the storage device, the host system may dynamically detect the data access performance of the storage device and instruct the storage device to operate at one of a plurality of power states under the normal working state. Accordingly, the operational stability of the storage device under normal working state may be effectively improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A power state control method, comprising:

establishing a connection between a host system and a storage device;

detecting, through a memory controller in the storage device, at least one of a data reading speed and a data writing speed of a memory module in the storage device under a normal working state in real time;

querying a data table which records setting information corresponding to a plurality of candidate power states of the normal working state according to the at least one of the data reading speed and the data writing speed of the memory module detected by the memory controller in real time;

instructing the storage device to operate at one of the candidate power states according to a query result of the data table, wherein the setting information reflects that the candidate power states comprises a first power state and a second power state, the first power state is configured to limit a total power consumption of the storage device to be no greater than a first percentage of a maximum power limit, the second power state is configured to limit the total power consumption to be no greater than a second percentage of the maximum power limit, and the first percentage is different from the second percentage.

2. The power state control method as claimed in claim 1, wherein the step of detecting, through the memory controller in the storage device, the at least one of the data reading speed and the data writing speed of the memory module in the storage device under the normal working state in real time comprises:

sending a query command to the storage device through the connection;

receiving a response from the storage device with respect to the query command; and obtaining data access performance of the storage device according to the response.

3. The power state control method as claimed in claim 1, wherein the step of instructing the storage device to operate at the one of the candidate power states according to the query result of the data table comprises:

selecting one of the candidate power states as a target power state according to the query result of the data table; and sending a setting command to the storage device according to the target power state, wherein the setting command is configured to set the storage device to operate at the target power state.

4. The power state control method as claimed in claim 1, wherein the candidate power states correspond to different power upper limits of the normal working state.

5. The power state control method as claimed in claim 1, wherein the connection complies with a Non-Volatile Memory Express interface standard.

6. A data storage system, comprising:

a host system; and a storage device, coupled to the host system, wherein the host system is configured to:

establish a connection between the host system and the storage device;

detect, through a memory controller in the storage device, at least one of a data reading speed and a data writing speed of a memory module in the storage device under a normal working state in real time;

query a data table which records setting information corresponding to a plurality of candidate power states of the normal working state according to the at least one of the data reading speed and the data writing speed of the memory module detected by the memory controller in real time;

instruct the storage device to operate at one of the candidate power states according to a query result of the data table, wherein the setting information reflects that the candidate power states comprises a first power state and a second power state, the first power state is configured to limit a total power consumption of the storage device to be no greater than a first percentage of a maximum power limit, the second power state is configured to limit the total power consumption to be no greater than a second percentage of the maximum power limit, and the first percentage is different from the second percentage.

7. The data storage system as claimed in claim 6, wherein the operation of detecting, through the memory controller in the storage device, the at least one of the data reading speed and the data writing speed of the memory module in the storage device under the normal working state in real time comprises:

sending a query command to the storage device through the connection;

receiving a response from the storage device with respect to the query command; and obtaining data access performance of the storage device according to the response.

8. The data storage system as claimed in claim 6, wherein the the operation of instructing the storage device to operate at the one of the candidate power states of the normal working state according to the query result of the data table comprises:

selecting one of the candidate power states as a target power state according to the query result of the data table; and sending a setting command to the storage device according to the target power state, wherein the setting command is configured to set the storage device to operate at the target power state.

9. The data storage system as claimed in claim 6, wherein the candidate power states correspond to different power upper limits of the normal working state.

10. The data storage system as claimed in claim 6, wherein the connection complies with the Non-Volatile Memory Express interface standard.

* * * * *